United States Patent
Fujio et al.

(10) Patent No.: US 11,360,009 B2
(45) Date of Patent: Jun. 14, 2022

(54) FRACTURE-VISUALIZATION SENSOR AND FRACTURE-VISUALIZATION SYSTEM USING SAME

(71) Applicant: NATIONAL INSTITUTE OF ADVANCED INDUSTRIAL SCIENCE AND TECHNOLOGY, Tokyo (JP)

(72) Inventors: Yuki Fujio, Tosu (JP); Nao Terasaki, Tosu (JP)

(73) Assignee: NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 237 days.

(21) Appl. No.: 16/957,646

(22) PCT Filed: Sep. 21, 2018

(86) PCT No.: PCT/JP2018/035154
§ 371 (c)(1),
(2) Date: Jun. 24, 2020

(87) PCT Pub. No.: WO2019/130689
PCT Pub. Date: Jul. 4, 2019

(65) Prior Publication Data
US 2021/0404922 A1    Dec. 30, 2021

(30) Foreign Application Priority Data

Dec. 26, 2017 (JP) .............................. JP2017-248960
Apr. 23, 2018 (JP) .............................. JP2018-082100

(51) Int. Cl.
*G01N 3/06* (2006.01)
*G01N 3/08* (2006.01)

(52) U.S. Cl.
CPC ............... *G01N 3/068* (2013.01); *G01N 3/08* (2013.01); *G01N 2203/0017* (2013.01); *G01N 2203/0067* (2013.01); *G01N 2203/027* (2013.01)

(58) Field of Classification Search
CPC .. G01N 3/068; G01N 3/08; G01N 2203/0017; G01N 2203/0067; G01N 2203/027
(Continued)

(56) References Cited

U.S. PATENT DOCUMENTS 9,772,069 B2 * 9/2017 Jeong ..................... B05D 1/005
11,004,572 B2 * 5/2021 Terasaki ............. C09K 11/7771
(Continued)

FOREIGN PATENT DOCUMENTS

EP     0522609 A1 *  1/1993
EP     3705874 A1 *  9/2020    ......... C09K 11/7734
(Continued)

OTHER PUBLICATIONS

ISA Japan Patent Office, International Search Report Issued in Application No. PCT/JP2018/034154, dated Dec. 18, 2018, WIPO, 2 pages.
(Continued)

*Primary Examiner* — Octavia Davis Hollington
(74) *Attorney, Agent, or Firm* — McCoy Russell LLP (57) ABSTRACT

To provide a fracture-visualization sensor capable of visualizing the fracture behavior of a composite material and a composite-material fracture-visualization system using the fracture-visualization sensor.
A first luminescent film including a mechanoluminescent material is provided on one surface of a composite material. The first luminescent film has a maximum stress per unit of cross-sectional area within the range of 19-43 $N/mm^2$.

9 Claims, 4 Drawing Sheets

(58) Field of Classification Search
USPC .......................................................... 73/788
See application file for complete search history.

(56) References Cited

U.S. PATENT DOCUMENTS

| | | | |
|---|---|---|---|
| 11,225,603 B2* | 1/2022 | Xu ........................ | C09K 11/643 |
| 2008/0120045 A1* | 5/2008 | Hyodo .................... | G01L 1/248 |
| | | | 702/42 |
| 2009/0050847 A1* | 2/2009 | Xu ........................... | F21K 2/04 |
| | | | 252/301.4 R |
| 2009/0114033 A1* | 5/2009 | Xu .......................... | G01L 1/241 |
| | | | 73/800 |
| 2016/0053172 A1* | 2/2016 | Mori ........................ | C08K 3/22 |
| | | | 252/301.36 |
| 2020/0116773 A1* | 4/2020 | Terasaki ............. | C09K 11/7734 |

FOREIGN PATENT DOCUMENTS

| | | | |
|---|---|---|---|
| JP | 2005075838 A | | 3/2005 |
| JP | 2020016624 A | * | 1/2020 |
| WO | 2012161197 A1 | | 11/2012 |

OTHER PUBLICATIONS

Hirano, Y. et al., "Evaluation of Strain Rate Dependent Tensile Fracture Behavior of CFRP with High-speed Imaging and DIC," Journal of the Visualization Information Society, vol. 35, No. 138, Apr. 20, 2015, 9 pages. (Submitted with English Abstract).

* cited by examiner

FRACTURE-VISUALIZATION SENSOR AND FRACTURE-VISUALIZATION SYSTEM USING SAME

CROSS-REFERENCE TO RELATED APPLICATIONS

The present application is a U.S. National Phase of International Patent Application Serial No. PCT/JP2018/035154 entitled "FRACTURE-VISUALIZATION SENSOR AND FRACTURE-VISUALIZATION SYSTEM USING SAME," filed on Sep. 21, 2018. International Patent Application Serial No. PCT/JP2018/035154 claims priority to Japanese Patent Application No. 2017-248960 filed on Dec. 26, 2017 and Japanese Patent Application No. 2018-082100 filed on Apr. 23, 2018. The entire contents of each of the above-referenced applications are hereby incorporated by reference for all purposes.

TECHNICAL FIELD

The present invention relates to a fracture-visualization sensor that is capable of visualizing the fracture behavior of a composite material, and to a fracture-visualization system that uses that sensor.

BACKGROUND

In various industries such as the aircraft industry and the automobile industry, since understanding the fracture behavior of composite materials leads to improvement of techniques for numerical analysis and to advanced design of structures, accordingly, in recent years, research and development has been performed into the use of various measurement methods related to the fracture behavior of composite materials.

For instance, fracture behavior analysis of a composite material may be performed by employing strain gauges or digital image analysis. Furthermore, a fracture sensor has been proposed (refer to PTL1 and NPTL1) that detects deformation of a target for detection on the basis of fracture of a fracture portion having a non-fracture portion that is brittle.

CITATION LIST

Patent Literature

PTL1: International Patent Laying Open Publication Number WO2012/161197.

Non-Patent Literature

NPTL1: Hirano Yoshiyasu, Visualization Information, Vol. 35, No. 138, 26, (2015).

SUMMARY OF INVENTION

Technical Problem

However, with a measurement method that employs strain gauges, since the fracture behavior is evaluated according to numerical values that are only measured at the locations where the strain gauges are attached, accordingly there is the problem that it is not possible accurately to evaluate variations in the strength and the physical properties originating in non-uniformities of the composite material and so on, and also there is the problem that, if the film of a strain gauge is at the same location as a fracture, then the strain gauge itself exerts some influence upon the fracture behavior.

Moreover, with a measurement method that employs digital image analysis, although it is possible to evaluate the strain distribution immediately before fracture, there is the problem that it is not possible to evaluate the fracture behavior in an accurate manner since the composite material itself fluctuates greatly directly after fracture; and furthermore there is the problem that, due to the theory of measurement in which the amounts of displacement are measured at a plurality of points in a random pattern upon the surface of the subject material, in the case of an actual three dimensional structure or the like which has substantial depth, since the focal point of the camera is aligned upon only one surface, accordingly it is not possible accurately to measure the entire structural element in depth.

Yet further, even with the fracture sensor disclosed in PTL1 described above, it is possible to evaluate the strain distribution up until directly before fracture, but there is the problem that it is not possible to evaluate the fracture behavior in an accurate manner.

In particular, since a composite material is made as a structure in which two or more materials such as laminates or fabrics or the like are laminated together, accordingly the fracture behavior becomes complicated, and there is the problem that it is difficult accurately to evaluate the fracture behavior with the measurement methods described above.

Solution to Technical Problem

As a result of diligent research conducted by the inventors of the present invention, they have developed a fracture-visualization sensor and a fracture-visualization system of the following revolutionary type.

According to a first aspect of the present invention that solves the problems described above, there is provided a fracture-visualization sensor, characterized in that a first luminescent film that includes a mechanoluminescent material is provided upon one surface of a composite material, and the maximum stress of the first luminescent film is in the range of from 19 N/mm² to 43 N/mm².

Here, the term "composite material" refers to a composite of fiber and resin: for the fiber, for instance, glass fiber, carbon fiber, aramid fiber, polyethylene fiber, zylon fiber, boron fiber, cellulose nanofiber, or the like may be suggested; and, for the resin, for instance, an epoxy resin, a vinyl ester resin, a phenol resin, a thermoplastic resin, or the like may be suggested.

Moreover, the term "maximum stress $\sigma_{max}$" refers to a value that is calculated by employing the following Equation from the maximum load Fma as measured with a tension tester when, after a letter-U shaped notch (length 2 mm, width 0.1 mm) has been formed in the center edge portion of a luminescent film of thickness 11 µm that has been formed upon an aluminum foil in the direction orthogonal to its direction of tension and this luminescent film (including the aluminum foil) is pulled out using a tension tester or the like and this luminescent film has been fractured. It should be understood that S is the cross sectional area of this luminescent film.

$$\sigma_{max} = F_{max}/S \qquad \text{Equation 1}$$

The properties (sensitivity, luminescent intensity, capability of tracking the composite material (i.e. the quality by which the luminescent film deforms according to deformation of the composite material) and so on) of the first luminescent film of the present invention greatly vary according to conditions of various types, such as the density of the mechanoluminescent material, the type of resin that is employed for its manufacture and the density thereof, and so on. Due to this, it is not possible to specify the first luminescent film of the present invention by the density or the type of resin of its mechanoluminescent material or the like. Accordingly, the inventors of the present application have repeatedly performed investigations by trial and error related to the necessary characteristics for specifying the first luminescent film of the present invention, and have discovered that its characteristic that can most appropriately be specified is its maximum stress $\sigma_{max}$. The same applies to the second luminescent film that will be described hereinafter.

It should be understood that, if the maximum stress per unit cross sectional area is lower than 19 N/mm², then the first luminescent film is not capable of tracking the deformation of the composite material, and the first luminescent film is destroyed before the composite material fractures, so that it is not possible to visualize the fracture behavior of the composite material. On the other hand, if the maximum stress per unit cross sectional area is greater than 43 N/mm², then the first luminescent film exerts an influence upon the mechanical properties of the composite material, and it is not possible to visualize its fracture behavior accurately. The same applies to the second luminescent film that will be described hereinafter.

With this first aspect of the present invention, since the first luminescent film emits light along with deformation of the composite material up until the composite material fractures, accordingly it is possible to visualize the fracture behavior of the composite material (i.e. the change over time of the distribution of the degree of deformation of the composite material until it fractures). In other words, since some portions of the first luminescent film that are formed over certain regions upon the one surface of the composite material emit light more strongly according to the speeds of deformation of those regions (for example, the portions of the first luminescent film that correspond to portions of the composite material for which the degree of deformation is the largest), accordingly it is possible to visualize the fracture behavior of the composite material (i.e. changes over time of the distribution of the degree of deformation of the composite material, until it fractures) in an accurate manner. And, by analyzing the fracture behavior that has thus been visualized, it is possible to accelerate the development of composite materials with further improved mechanical properties such as strength and so on.

Furthermore, according to this first aspect of the present invention, even if the fracture progresses from the other surface of the composite material or from its interior, it is still possible to visualize this type of fracture behavior, since such fracture behavior on the other surface or in the interior of the composite material exerts an influence upon its one surface.

And, according to a second aspect of the present invention, there is provided a fracture-visualization sensor according to the first aspect described above, characterized in that the maximum stress per unit cross sectional area of the first luminescent film is in the range of from 20 N/mm² to 40 N/mm².

According to this second aspect of the present invention, it is possible to visualize the fracture behavior of the composite material more accurately, since the first luminescent film does not exert any influence upon the fracture behavior of the complex material and moreover is capable of sufficiently tracking the deformation of the complex material.

And, according to a third aspect of the present invention, there is provided a fracture-visualization sensor according to the first or the second aspect of the present invention described above, characterized in that a second luminescent film that includes a mechanoluminescent material is provided upon another surface of the composite material, and that the maximum stress per unit cross sectional area of the second luminescent film is in the range of from 19 N/mm² to 43 N/mm².

According to this third aspect of the present invention, the second luminescent film emits light along with deformation of the composite material until the composite material fractures, and accordingly it is possible to visualize the fracture behavior of the composite material in a more accurate manner.

And, according to a fourth aspect of the present invention, there is provided a fracture-visualization sensor according to the third aspect of the present invention described above, characterized in that the maximum stress per unit cross sectional area of the second luminescent film is in the range of from 20 N/mm² to 40 N/mm².

According to this fourth aspect of the present invention, it is possible to visualize the fracture behavior of the composite material more accurately, since the second luminescent film does not exert any influence upon the fracture behavior of the complex material and moreover is capable of sufficiently tracking the deformation of the complex material.

And, according to a fifth aspect of the present invention, there is provided a fracture-visualization sensor according to any one of the first through the fourth aspects of the present invention described above, characterized in that the composite material is a carbon fiber composite material or a glass fiber composite material.

Here, the term "carbon fiber composite material" refers, for instance, to a carbon fiber reinforced plastic (CFRP), while the term "glass fiber composite material" refers, for instance, to a glass fiber reinforced plastic (GFRP).

According to this fifth aspect of the present invention, it is possible to visualize the fracture behavior of a carbon fiber composite material or of a glass fiber composite material, which was not possible with prior art technology.

And, according to a sixth aspect of the present invention, there is provided a fracture-visualization system that visualizes the fracture behavior of a composite material, characterized by comprising a fracture-visualization sensor according to any one of the first through the fifth aspects of the present invention described above and a load application means that applies a load to the composite material.

According to this sixth aspect of the present invention, it is possible to visualize the fracture behavior of the composite material simply and easily.

And, according to a seventh aspect of the present invention, there is provided a fracture-visualization system according to the sixth aspect of the present invention described above, characterized by further comprising a first recording means, disposed at one surface of the composite material, that records the state of luminescence of the first luminescent film.

According to this seventh aspect of the present invention, it is possible more clearly to ascertain the fracture behavior of the composite material, since it is possible to record the state of luminescence of the first luminescent film.

Furthermore, while the composite material is made from a plurality of source materials (the first stage of source materials), according to this aspect of the present invention, by performing image processing (enlargement and so on) upon the luminescent state of the luminescent film that has been obtained, it is also possible simultaneously to visualize the fracture behavior of the first state source materials (i.e. the distribution of their degree of deformation).

Moreover, if the materials that make up the structure of the composite material (i.e. the first stage source materials) themselves are in turn composed of a plurality of source materials (i.e. second stage source materials), then it is possible to visualize the fracture behavior of these second stage source materials at the same time by performing similar image processing (enlargement and so on). And, even if the composite material consists of even more stages of source materials, in a similar manner, it is still possible to visualize the fracture phenomena of all these stages of source materials simultaneously.

And, according to an eighth aspect of the present invention, there is provided a fracture-visualization system according to the seventh aspect of the present invention described above, characterized by further comprising a second recording means, disposed at another surface of the composite material, that records the state of luminescence of the second luminescent film.

According to this eighth aspect of the present invention, it is possible more clearly to ascertain the fracture behavior of the composite material, since it is possible to record the state of luminescence of the second luminescent film. Furthermore, by performing image processing (enlargement and so on) upon the luminescent state of the second luminescent film that has been recorded by the second recording means, it is possible simultaneously to visualize the fracture phenomena of all the stages of source materials, similarly to the case with the first luminescent film of the seventh aspect of the present invention.

DETAILED DESCRIPTION OF EMBODIMENTS

Embodiments of a fracture-visualization sensor according to the present invention and of a fracture-visualization system that employs such a sensor will now be explained with reference to the attached drawings. However, the present invention is not limited to the following embodiments.

The First Embodiment

Figure 1:
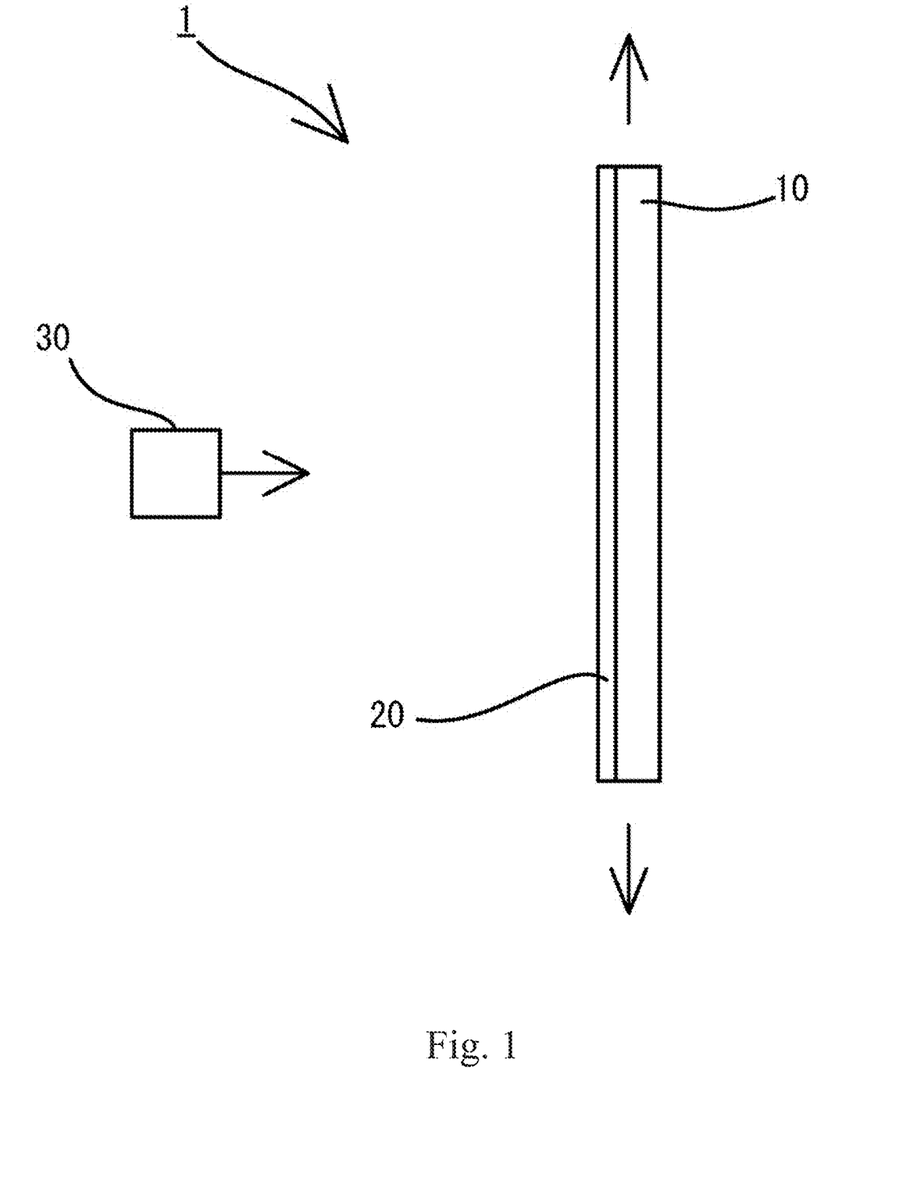
FIG. 1 is a schematic side view of a fracture-visualization system according to a first embodiment.

FIG. 1 is a schematic side view of a fracture-visualization system according to this first embodiment. As shown in this figure, the fracture-visualization system 1 according to this embodiment comprises: a composite material block 10 that is shaped as a rectangular plate, on the one surface of which a first luminescent film 20 that includes a mechanoluminescent material is provided; a first recording means 30 that is installed in a direction to face that one surface of the composite material 10; and a load application means (not shown in the figures) that is attached to the upper portion and to the lower portion of the composite material 10 and that is capable of tensioning the composite material 10 in the vertical direction (i.e. of applying a load thereto). In this embodiment, the first luminescent film 20 functions as a fracture-visualization sensor.

The composite material 10 is not particularly limited, provided that it is composed of two or more materials, and its shape and size are not particularly limited. For example, composite materials that may be cited in this context include carbon fiber reinforced plastic (CFRP), glass fiber reinforced plastic (GFRP), plywood, plywood and reinforced concrete composite, concrete, reinforced concrete, ceramic based composite (Ceramic Matrix Composite), pykrete, and so on.

The first luminescent film 20 includes a mechanoluminescent material that emits light according to deformation of the composite material 10, and is not particularly limited provided that its maximum stress per unit cross sectional area is in the range from 19 $N/mm^2$ to 43 $N/mm^2$, and preferably is in the range from 20 $N/mm^2$ to 40 $N/mm^2$. This first luminescent film 20, for example, may be manufactured by uniformly mixing together an epoxy resin or a urethane resin, a curing agent and a solvent for controlling the cross-linking and curing reaction of the resin, and a mechanoluminescent material and a dispersing agent or auxiliary agent for uniformly dispersing that mechanoluminescent material, and applying this mixture to one of the surfaces of the composite material 10 and hardening it.

The mechanoluminescent material is not particularly limited, provided that it emits light (including visible light, ultraviolet light, or near infrared light) due to deformation (i.e. strain) generated by an external mechanical force. As such mechanoluminescent materials, for example, there may be cited materials in which an oxide having a stuffed tridymite structure, a three dimensional network structure, a feldspar structure, a crystalline structure with lattice defect control, a wurtz structure, a spinel structure, a corundum structure, or a R alumina structure is made from a sulfide, a phosphate, a silicate, a carbide, or a nitride, and including, as centers of luminescence, for example, rare earth ions consisting of Sc, Y, La, Ce, Pr, Nd, Pm, Sm, Eu, Gd, Tb, Dy, Ho, Er, Tm, Yb, or Lu, or transition metal ions consisting of Ti, Zr, V, Cr, Mn, Fe, Co, Ni, Cu, Zn, Nb, Mo, Ta, or W, combined with a base material.

Among these, when for example employing a compound oxide containing strontium and aluminum as the base material, it is desirable to use $xSrO \cdot yAl_2O_3 \cdot zMO$ or $xSrO \cdot yAl_2O_3 \cdot zSiO_2$ as the mechanoluminescent material (where M is not particularly limited provided that it is a divalent metal, but Mg, Ca, or Ba are preferable, and x, y, and z are integers equal to 1 or greater), and it is more desirable to use $SrMgAl_{10}O_{17}$:Eu, $(Sr_xBa_{1-x})Al_2O_4$:Eu ($0<x<1$), or $BaAl_2SiO_8$:Eu. And, in this embodiment, it is most desirable to use an $\alpha$-$SrAl_2O_4$ structure for the mechanoluminescent material and to use Eu for the luminescent centers.

Furthermore, as the mechanoluminescent material, in order to enhance the luminescent sensitivity to strain, it is preferable to add a substance that causes the generation of lattice defects during the manufacture of the mechanoluminescent material, and in particular it is desirable to add Ho. By adding such a substance that causes the generation of lattice defects, it is possible to enhance the luminescent sensitivity to high strain energy. The average particle diameter of the mechanoluminescent material (as measured by the laser diffraction method) is desirably 20 μm or less, and more desirably is 10 μm or less.

The density (i.e. the mass ratio) of the mechanoluminescent material included in the first luminescent film 20 is not particularly limited, but it is preferable for it to be in the range of 20 wt % to 80 wt % because then it is possible to obtain sufficient luminescent intensity (i.e. luminance), and it is more preferable for it to be in the range of 40 wt % to 80 wt % because then it is possible to obtain luminescence of higher emission intensity. Moreover, although the thickness of the first luminescent film 20 is not particularly limited, it is desirable for this thickness to be in the range of 1 μm to 1 mm from the standpoints of luminescent intensity and ease of handling, and it is more desirable for the thickness to be in the range of 10 μm to 500 μm from the standpoints of luminescent intensity and ease of handling.

Yet further, before visualizing the fracture behavior of the composite material 10, it would also be possible to irradiate ultraviolet rays upon the first luminescent film 20. It is possible to enhance the luminescent intensity (i.e. the luminance) of the first luminescent film 20 by such irradiation with ultraviolet rays. Furthermore, it would also be possible to visualize the fracture behavior during irradiation with ultraviolet rays. It is possible to keep the luminescent intensity of the first luminescent film 20 high by continuously irradiating it with ultraviolet rays.

The first recording means 30 is not particularly limited, provided that it is capable of recording the state of luminescence of the first luminescent film 20. A commercially available digital camera, a digital video camera, or a high sensitivity video camera or the like are examples that may be suggested for the first recording means 30.

The load application means is not particularly limited, provided that it is capable of tensioning the composite material 10 in the vertical direction, and provided that it is capable of measuring the load (i.e. the stress). For example, a tension tester or the like may be suggested for the load application means.

Figure 2:
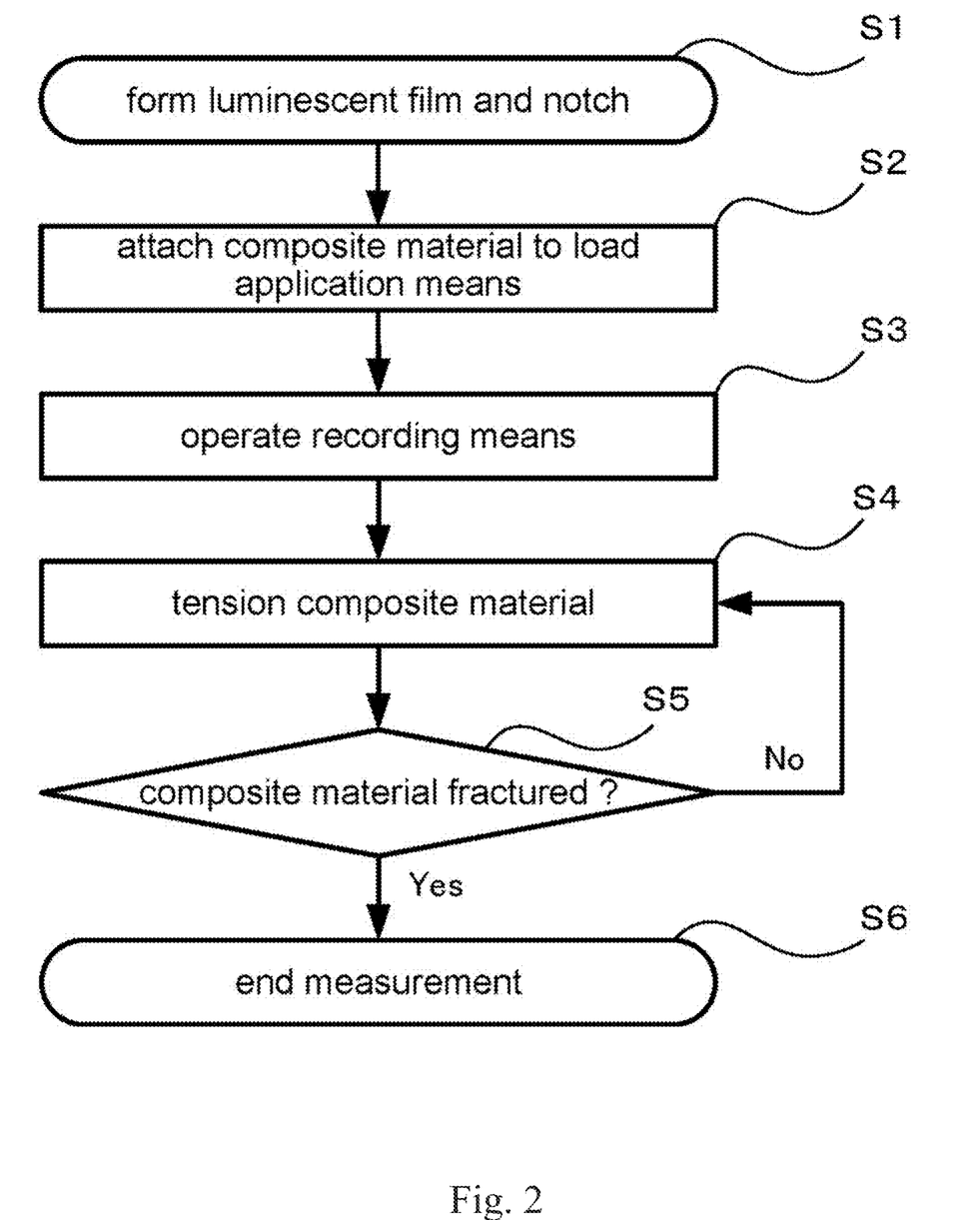
FIG. 2 is a flow chart showing the operation of this fracture-visualization system according to the first embodiment.

Next, the operation of the fracture-visualization system 1 according to this embodiment will be explained with reference to FIG. 2. FIG. 2 is a flow chart showing the operation of the fracture-visualization system 1 according to this embodiment.

First, after having formed the first luminescent film 20 upon one surface of the composite material 10, a letter-U shaped notch is formed on the left side end portion of the central portion in the vertical direction of the composite material 10 (S1). And then this composite material 10 is attached to the load application means (S2). Next, the first recording means 30 is operated (S3).

Then, the composite material 10 is tensioned in the vertical direction by employing the load application means (S4). When this is done, the first luminescent film 20 emits light according to the state of the one surface of the composite material 10. In other words, when the composite material 10 is tensioned in the vertical direction, the first luminescent film 20 is also tensioned and extended in the vertical direction along with the composite material 10. As a result, the first luminescent film 20 emits light with an intensity that corresponds to the amount of deformation of the extension and the speed of deformation. This state of luminescence is recorded by the first recording means 30 as image data or the like. At this time, the first recording means 30 may record the state of luminescence of the first luminescent film 20 continuously, or alternatively may record it at fixed time intervals, for example frame by frame.

And operation of this type is repeated until the composite material 10 fractures (S5), and measurement terminates at the time point that the composite material fractures (S6). It should be understood that the operations S4 through S6 may be performed continuously or sequentially.

Since, as explained above, due to the structure of the fracture-visualization system 1, the first luminescent film 20 luminesces along with deformation of the composite material 10 until the composite material 10 fractures, accordingly it is possible to visualize and record the fracture behavior of the composite material 10 (i.e. to visualize and record changes over time in the distribution of the amount of deformation of the composite material 10, until it fractures). In other words since, corresponding to the speed of deformation of each of the regions on the one surface of the composite material 10, portions of the first luminescent film 20 that are formed over those regions luminesce with corresponding intensity (in other words, the portions of the first luminescent film 20 that correspond to the portions of the composite material 10 that are most deformed luminesce most strongly), accordingly it is possible to visualize the fracture behavior of the composite material 10 in an accurate manner, and moreover it is possible to record that behavior with the first recording means 30.

Furthermore, although the composite material is made from a plurality of source materials (i.e. of first stage source materials), by performing image processing (i.e. enlargement and so on) upon the state of luminescence of the first luminescent film 20 that has been obtained with the present invention, it is also possible simultaneously to visualize the fracture behavior (i.e. the distribution of the amounts of deformation) of the first stage source materials.

Yet further, if the source materials that constitute the composite material (i.e. the first stage source materials) themselves are also further made up from pluralities of source materials (i.e. second stage source materials), then it is also possible simultaneously to visualize the fracture behavior of these second stage source materials by performing similar image processing (i.e. enlargement and so on). And, even if the composite material is made from a large number of stages of source materials, it is still possible simultaneously to visualize the fracture behavior of the source materials of all those stages.

First Concrete Example

In order to investigate the relationship between the maximum stress upon the luminescent film and visualization of the fracture behavior of the composite material, the following experiments were conducted.

First, luminescent films A through F shown in Table 1 were formed upon aluminum foil of thickness 11 μm. $SrAl_2O_4$:$EU^{2+}$ (manufactured by Sakai Chemical Industry Co. Ltd.) was employed as the mechanoluminescent material, and an epoxy resin (manufactured by Dainippon Paint Co. Ltd.) was used as the resin. The luminescent films were formed by layering the films upon the aluminum foil with a screen printing machine, using paste made from the mechanoluminescent material and the resin. Next, in order to fix the position of the fracture portions, i.e. of the portions where fracture was expected to occur, letter-U shaped notches (length 2 mm, width 0.1 mm) were formed at the left side edge portions of the central portions in the vertical direction of the manufactured films (length 30 mm, width 10 mm). And the films were attached to a tension tester, and the maximum loads at break were measured. Subsequently, the cross-sectional area of each luminescent film was measured, and the maximum stresses were calculated using Equation 1 above.

Furthermore, graphs were created by plotting the stress value (i.e. a value obtained by dividing the tension load imposed upon the luminescent film by the cross sectional area of the luminescent film) against the strain value obtained from the tension test (i.e. a value obtained by dividing the stretched distance by the distance from the fixed base jig of the testing machine). And, using straight line regions from the origin 0 of the curve that is obtained to some specified strain value, the apparent moduli of elasticity (Young's modulus) are calculated from the inclination of these straight lines (i.e. from the amount of change of stress divided by the amount of change of strain). The results are shown in Table 1.

TABLE 1

| Luminescent film | Mechanoluminescent material/Resin (wt %) | Maximum stress (N/mm$^2$) | Apparent Young's modulus |
|---|---|---|---|
| A | 40/60 | 43 | 7 |
| B | 50/50 | 31 | 4 |
| C | 60/40 | 32 | 5 |
| D | 70/30 | 20 | 4 |
| E | 80/20 | 19 | 4 |
| F | 90/10 | 14 | 3 |

Next, luminescent films as detailed in Table 1 were formed upon the surfaces of blocks of carbon fiber reinforced plastic (product name TEPEX (registered trademark) Optilite 201-C200(4)/45%: length 105 mm, width 15 mm, thickness 1 mm) manufactured by Bond-Laminates GmbH, in a similar manner to the case of formation upon aluminum foil. Then, in order to fix the positions of the fracture portions, a letter-U shaped notch of length 5 mm and width 0.5 mm was formed on the left side of the central portion of each of these luminescent films.

Each of the blocks of composite material with luminescent film formed upon it was attached to a tension tester, and the luminescent state of the luminescent film was photographed at a speed of 1 mm/sec with a video camera until the composite material ruptured, and it was checked whether or not it was possible to visualize the fracture behavior of the composite material. The results are shown in Table 2.

TABLE 2

| Luminescent film | Maximum stress (N/mm$^2$) | Judged good |
|---|---|---|
| A | 43 | ○ |
| B | 31 | ○ |
| C | 32 | ○ |
| D | 20 | ○ |
| E | 19 | ○ |
| F | 14 | x |

Figure 3:
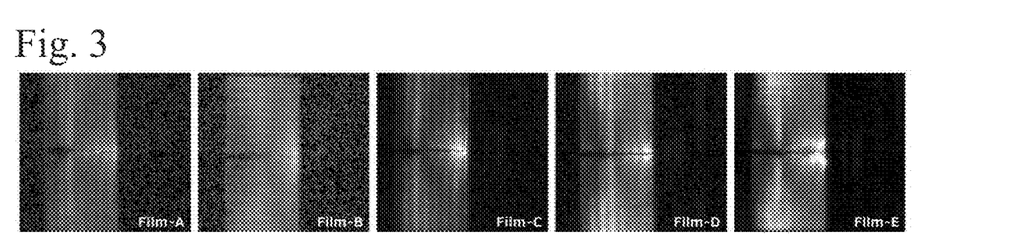
FIG. 3 is a set of photographs showing, for a first concrete example, the states of luminescence of luminescent films for which it was determined that the fracture behavior can be visualized.
Figure 4:
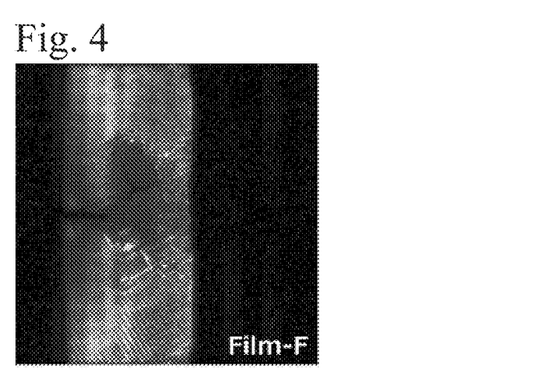
FIG. 4 is a photograph showing, for this first concrete example, the state of luminescence of a luminescent film for which it has been determined that the fracture behavior cannot be visualized.

Here "judged good" "○"as shown in FIG. 3 indicates that it could be determined that the luminescent state of the luminescent film was such that it was possible to visualize the fracture behavior, while "judged good" "x"as shown in FIG. 4 indicates that it could not be determined that the luminescent state of the luminescent film was such that it was possible to visualize the fracture behavior As will be understood from Table 2, it was possible to visualize the fracture behavior of the composite material with the luminescent film A (Film-A) through the luminescent film E (Film-E). In other words, it will be understood that it was possible to visualize the fracture behavior of the composite material when a luminescent film was employed whose maximum stress was from 19 N/mm$^2$ to 43 N/mm$^2$.

Second Concrete Example

The following experiment was performed in order to check whether it was possible to visualize the fracture behavior of the composite material. A carbon fiber reinforced plastic (product name TEPEX (registered trademark) Optilite 201-C200(4)/45%: length 105 mm, width 15 mm, thickness 1 mm) manufactured by Bond-Laminates GmbH was employed as the composite material, and, over its entire surface, as the first luminescent film, a mixture of $SrAl_2O_4$:$EU^{2+}$ (manufactured by Sakai Chemical Industry Co. Ltd.) and an epoxy resin (manufactured by Dainippon Paint Co. Ltd.) was provided by application and hardening (thickness 37 μm, maximum stress $\sigma_{max}$ 32 N/mm$^2$). A letter-U shaped notch of length 5 mm and width 0.5 mm was formed on the left side end portion of the central portion of this composite material in the vertical direction.

Figure 5:
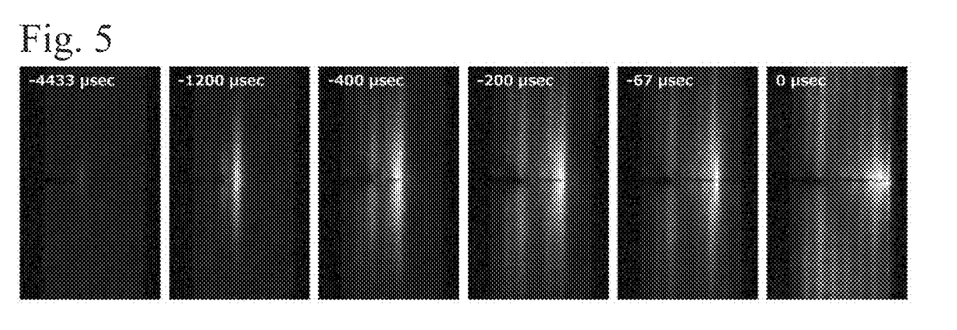
FIG. 5 is a set of photographs showing, for a second concrete example, the states of luminescence of luminescent films after predetermined time periods have elapsed from when another composite material has been pulled in the vertical direction.

Photographs are shown in FIG. 5 of the luminescent state of this first luminescent film after predetermined time periods elapsed when this block of composite material was attached to a tension tester and was pulled at a speed of 1 mm/sec in the vertical direction. It should be understood that the display shown at the upper left of each photograph in FIG. 5 shows the state of luminescence of the luminescent film from several tens of microseconds to several thousands of microseconds before the (reference) time point of 0 seconds when the composite material fractures.

As can be understood from these figures, when the composite material is tensioned by the tension tester, light first starts to be emitted from the region positioned on the right side of the notch, and then, along with the notch spreading rightward (as fracture progresses), the light is emitted as though the portion where the light is brightest were shifting to the right side. In this manner, it was understood that it was possible to visualize the fracture behavior of the composite material.

Furthermore, in the case of a material such as a composite material that fractures while rupturing its fibers, in a state in which no luminescent film is provided, it is difficult to image the point of origin of a fracture or the progress of a fracture by photography, and, with prior art measurement methods, it has been necessary to interrupt the testing and to identify the fracture portion from a microscope image in which the corresponding portion is magnified and photographed. By contrast it will be understood that, with the present invention, it is possible, in real time, to identify the fracture portion during the testing and to photograph the progress of fracture.

Third Concrete Example

Next, the same experiment as in the case of the second concrete example was performed with a glass fiber composite material. A glass fiber reinforced plastic (product name TEPEX (registered trademark) Optilite @ 101-RG600(2)/45%: length 105 mm, width 15 mm, thickness 1 mm) manufactured by Bond-Laminates GmbH was employed as the composite material, and, over its entire surface, as the first luminescent film, a mixture of $SrAl_2O_4:EU^{2+}$ (manufactured by Sakai Chemical Industry Co. Ltd.) and an epoxy resin (manufactured by Dainippon Paint Co. Ltd.) was provided by application and hardening (thickness 38 µm, maximum stress $\sigma_{max}$ 31 $N/mm^2$). A letter-U shaped notch of length 5 mm and width 0.5 mm was formed on the left side edge portion of the central portion in the vertical direction of this composite material.

Figure 6:
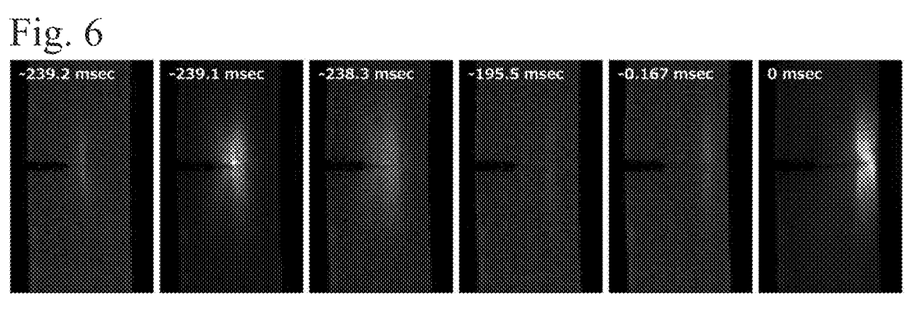
FIG. 6 is a is a set of photographs showing, for a third concrete example, the states of luminescence of luminescent films after predetermined time periods have elapsed from when yet another composite material has been pulled in the vertical direction.

And photographs are shown in FIG. 6 of the state of luminescence of the first luminescent film after predetermined time period have elapsed when this composite material was attached to a tension tester and was pulled in the vertical direction at 1 mm per second. It should be understood that the display shown at the upper left of each photograph in FIG. 6 shows the state of luminescence of the luminescent film from several tens of milliseconds to several thousands of milliseconds before the (reference) time point of 0 seconds when the composite material fractured.

As can be understood from these figures, in a similar manner to the case of the carbon fiber composite material, when this composite material was pulled by a tension tester, it was found that light started to be emitted from the region positioned at the right side of the first notch, and, as the notch widened rightward (i.e. as the fracture progressed), the brightest portion emitted light as though it were moving. It should be understood that the difference in size between the luminescence distribution of the carbon fiber composite material shown in FIG. 5 and the luminescence distribution of the glass fiber composite material shown in FIG. 6 is that the widths of the fiber bundles that make up the composite material was around 2 mm for the carbon fiber and around 4 mm for the glass fiber. Due to the above, it was understood that it was possible to visualize, in real time, the fracture behavior of the composite material while visualizing the load sharing by the fiber bundles making up the composite material.

The Second Embodiment

In the first embodiment, a load application means was utilized that was capable of pulling the composite material in the vertical direction so that the fracture behavior of the composite material was visualized when it was pulled in the vertical direction, but the present invention is not limited to this configuration.

Figure 7:
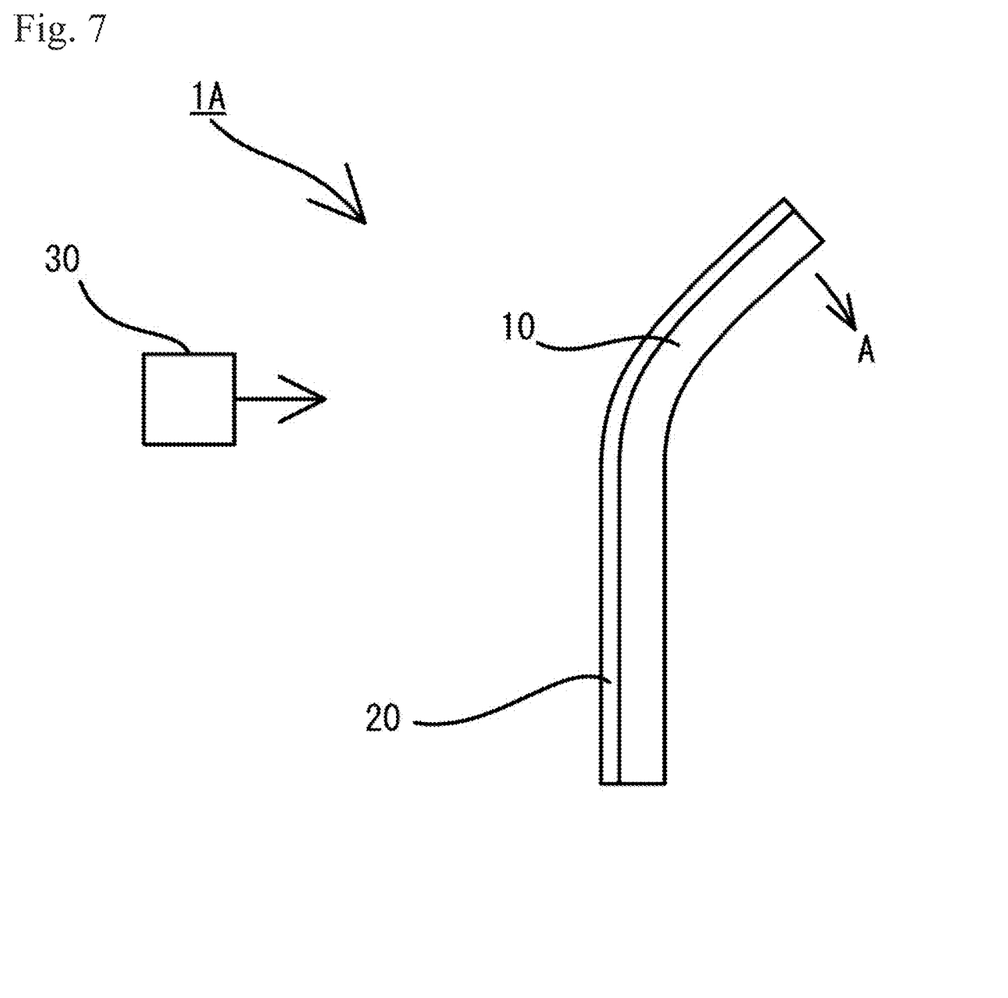
FIG. 7 is a schematic side view of a fracture-visualization system according to a second embodiment.

For example, as shown in FIG. 7, the present invention could also be employed for visualizing the fracture behavior of a composite material 10 when the composite material 10 is bent in a direction A. However, in this case, unlike the load application means of the first embodiment, it is of course necessary to construct the fracture-visualization system 1A by employing a load application means (not shown in the figures) that is capable of bending the composite material 10 in the direction A.

A bending tester that is capable of bending the composite material 10 in the direction A may be cited as an example of a load application means for this embodiment. It should be understood that other structures may be the same as that of the fracture-visualization system according to the first embodiment.

And it is possible to visualize the fracture behavior when the composite material 10 is bent in the direction A by operating in a similar manner to that of the fracture-visualization system of the first embodiment.

Other Embodiments

In the first embodiment, the first luminescent film (i.e. the fracture-visualization sensor) was provided on one surface of the composite material, but the present invention is not limited to this structure. For instance, it would also be acceptable further to provide a second luminescent film (i.e. another fracture-visualization sensor) upon the other surface of the composite material, and to dispose a second recording means to face that other surface of the composite material. It is possible to measure and record the state of luminescence of the second luminescent film by constructing the fracture-visualization system in this manner. In other words, the fracture behavior of the composite material can be visualized more accurately, since it is possible to measure and to record the states of luminescence of both sides of the composite material.

Here, similarly to the first luminescent film, the second luminescent film includes a mechanoluminescent material that emits light along with deformation of the composite material, and whose maximum stress per unit cross sectional area is not particularly limited provided that it is in the range of from 19 $N/mm^2$ to 43 $N/mm^2$; but it is preferable for that maximum stress to be in the range of from 20 $N/mm^2$ to 40 $N/mm^2$.

Moreover, in the embodiments described above, it was arranged to form the first luminescent film directly upon one of the surfaces of the composite material, but this is not limitative of the present invention. For instance it would also be acceptable to form the first luminescent film upon one surface of the composite material by adhering a luminescent film that is already formed upon one of the surfaces of the composite material.

Yet further, in the embodiments described above, a rectangular plate shaped block was employed as the composite material, but the present invention is not limited to that configuration. The shape of the composite material is not particularly limited, provided that it is possible to provide the first luminescent film and/or the second luminescent film upon its surface and/or surfaces; for example, a composite material piece having a complicated three dimensional shape could be employed. According to the present invention, it is also possible to visualize the fracture behavior of a piece of composite material having this type of complicated shape.

Even further while, in the embodiments described above, devices for pulling the composite material in the vertical direction or for bending it were employed as load application means, the load application means is not to be considered as being limited thereby, provided that it is capable of applying a load to the composite material and fracturing it, and provided that it is capable of measuring the load (i.e. the stress).

REFERENCE SIGNS LIST 1, 1A: fracture-visualization systems
10: composite material
20: first luminescent film
30: recording means

The invention claimed is:

1. A fracture-visualization sensor that is capable of visualizing a fracture phenomenon of a composite material, wherein:
   a first luminescent film that includes a mechanoluminescent material is provided upon one surface of said composite material; and
   the maximum stress per unit cross sectional area of said first luminescent film is in the range of from 19 N/mm$^2$ to 43 N/mm$^2$.

2. The fracture-visualization sensor according to claim 1, wherein the maximum stress per unit cross sectional area of said first luminescent film is in the range of from 20 N/mm$^2$ to 40 N/mm$^2$.

3. The fracture-visualization sensor according to claim 1, wherein:
   a second luminescent film that includes a mechanoluminescent material is provided upon another surface of said composite material; and
   the maximum stress per unit cross sectional area of said second luminescent film is in the range of from 19 N/mm$^2$ to 43 N/mm$^2$.

4. The fracture-visualization sensor according to claim 3, wherein the maximum stress per unit cross sectional area of said second luminescent film is in the range of from 20 N/mm$^2$ to 40 N/mm$^2$.

5. The fracture-visualization system that visualizes the fracture behavior of a composite material, wherein comprising:
   a fracture-visualization sensor according to claim 3; and
   a load application unit that applies a load to said composite material.

6. The fracture-visualization sensor according to claim 1, wherein said composite material is a carbon fiber composite material or a glass fiber composite material.

7. The fracture-visualization system that visualizes the fracture behavior of a composite material, wherein comprising:
   a fracture-visualization sensor according to claim 1; and
   a load application unit that applies a load to said composite material.

8. The fracture-visualization system according to claim 7, wherein further comprising a first recording means, disposed at one surface of said composite material, that records the state of luminescence of said first luminescent film.

9. The fracture-visualization system according to claim 8, wherein further comprising a second recording unit, disposed at another surface of said composite material, that records the state of luminescence of said second luminescent film.

* * * * *